United States Patent
McCaig

(10) Patent No.: US 7,308,182 B2
(45) Date of Patent: Dec. 11, 2007

(54) OPTICAL AMPLIFIERS

(75) Inventor: Peter Wilson McCaig, Devon (GB)

(73) Assignee: Bookham Technology plc, Northamptonshire (GB)

( * ) Notice: Subject to any disclaimer, the term of this patent is extended or adjusted under 35 U.S.C. 154(b) by 93 days.

(21) Appl. No.: 11/053,985

(22) Filed: Feb. 9, 2005

(65) Prior Publication Data
US 2005/0175272 A1   Aug. 11, 2005

(30) Foreign Application Priority Data
Feb. 10, 2004   (GB)   ................. 0402853.6

(51) Int. Cl.
*G02B 6/00*   (2006.01)
(52) U.S. Cl. .................. 385/135; 385/14; 385/40; 385/147; 359/341.1; 359/333
(58) Field of Classification Search ............ 385/40–41, 385/14, 134–135, 147, 94, 341; 361/119; 174/52.3; 359/341, 337, 140
See application file for complete search history.

(56) References Cited

U.S. PATENT DOCUMENTS

| | | | | |
|---|---|---|---|---|
| 5,155,649 A | * | 10/1992 | Hung et al. | .................. 361/119 |
| 5,393,931 A | * | 2/1995 | Guenther | ..................... 174/547 |
| 5,703,708 A | * | 12/1997 | Das et al. | ..................... 398/102 |
| 5,778,132 A | | 7/1998 | Csipkes et al. | |
| 6,147,795 A | * | 11/2000 | Derbyshire et al. | .......... 359/337 |
| 6,215,582 B1 | * | 4/2001 | Sudo et al. | .................. 385/137 |
| 6,477,053 B1 | | 11/2002 | Zeidan et al. | |
| 6,937,796 B2 | * | 8/2005 | Adams et al. | ................. 385/40 |
| 2005/0018950 A1 | * | 1/2005 | Arellano | ....................... 385/14 |

FOREIGN PATENT DOCUMENTS

| | | |
|---|---|---|
| EP | 1 137 131 A1 | 9/2001 |
| EP | 1 246 322 A2 | 10/2002 |
| EP | 1246322 A2 * | 10/2002 |
| GB | 2 373 588 A | 9/2002 |
| JP | 2000-091675 | 3/2000 |
| WO | 02/075379 A2 | 9/2002 |

OTHER PUBLICATIONS

International Search Report for International Application No. PCT/GB2005/050012 dated Apr. 19, 2005.

* cited by examiner

*Primary Examiner*—Brian Healy
*Assistant Examiner*—Guy G Anderson
(74) *Attorney, Agent, or Firm*—Renner, Otto, Boisselle & Sklar, LLP

(57) ABSTRACT

An optical amplifier comprises a printed circuit board (PCB) having at least one support layer of electrically non-conducting material and at least one conductive layer of electrically conducting material, and a foil heater in the form of a conductive track 20 on the PCB. A specified length of erbium optical fibre is wound around an aluminium spool mounted on the PCB and clamped by a clamp with the interposition of a thermal gasket, so that the optical fibre can be heated by the heater. Cutouts are provided in the PCB surrounding the heater to minimise loss of heat from the heater. The form of the heater enables it to be produced during fabrication of the optical fibre without utilising additional costly fabrication steps.

13 Claims, 5 Drawing Sheets

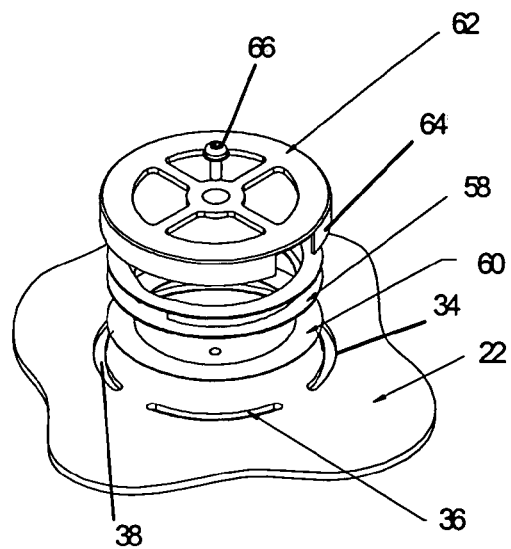
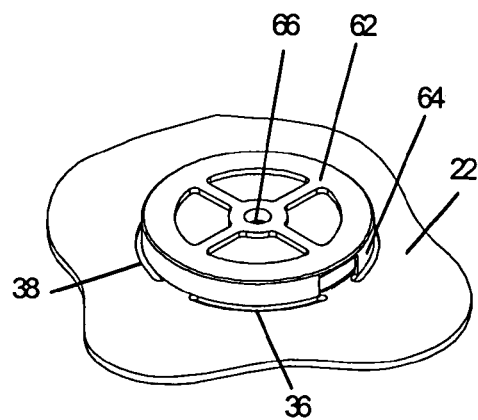
Figure 5          Figure 6
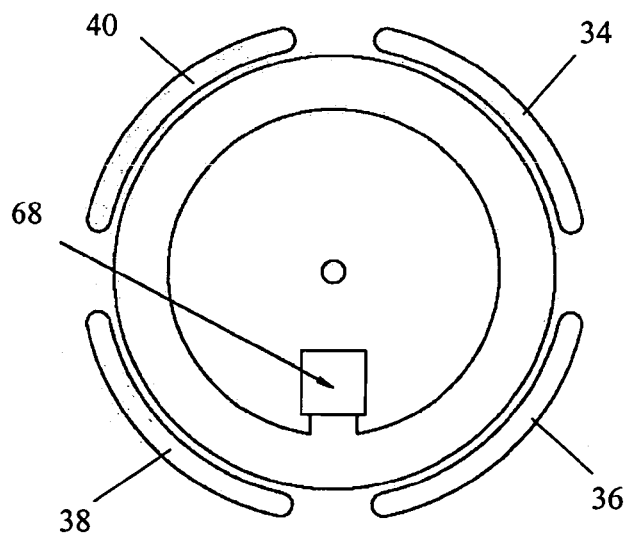
Figure 7

OPTICAL AMPLIFIERS

BACKGROUND OF THE INVENTION

In order to improve the gain flatness of erbium doped fibre amplifiers, it is known to raise the temperature of the erbium doped fibre by means of a foil heater, thus limiting the temperature excursion experienced by the erbium doped fibre under varying external thermal environments. Such a foil heater typically consists of an etched conductive track, manufactured to a specified length and corresponding resistance, sandwiched between two layers of a non-electrically conducting material.

FIG. 1 shows views from above and one side and an exploded perspective view of such a known optical amplifier in which a specified length of erbium optical fibre is wound around an aluminium spool 2 clamped within a housing 4 by a clamp 6 with the interposition of a thermal gasket 8 and the foil heater 10. The clamp 6 is held in position by a screw 12, and electrical connections to the foil heater 10 are made by way of a standard PCB connector 14 mounted on a projecting portion 16 of the heater.

In such an arrangement the foil heater 10 is pressed hard against the spool 2 through the interface of the thermal gasket 8 so that, when the foil heater 10 is powered up, the heat produced is transferred to the spool 2 and hence to the erbium optical fibre.

However such foil heaters are relatively costly to produce, and thus are a major limiting factor in preventing cost reductions in the manufacture of the optical amplifiers within which they are incorporated. The mechanical complexity of such heaters means that they are necessarily costly to manufacture and assemble.

It is an object of the present invention to provide an optical amplifier incorporating a heater which can be produced at low cost and in such a manner as to simplify assembly of the amplifier and reduce assembly time.

SUMMARY OF THE INVENTION

According to the present invention there is provided an optical amplifier comprising a multilayer board structure comprising at least one support layer of electrically non-conducting material and at least one conductive layer of electrically conducting material, a spool of optical fibre mounted on the board structure, and a heater for heating the optical fibre, characterized in that the heater is in the form of a resistive track within said at least one conductive layer for effecting resistive heating of the optical fibre.

Such an optical amplifier can be produced at relatively low cost due to the fact that the heater is in the form of a resistive track on the board structure, and it is therefore possible to incorporate this component during fabrication of the optical amplifier without utilizing additional costly fabrication steps. This means that the cost of providing the heater is reduced to virtually nothing. The time to market is also reduced by the use of such a structure, and the resultant reduction in the piece part count makes the amplifier easier to assemble and reduces the assembly time. There may also be an improvement in performance enabling either a reduction in the power consumption for the same temperature of the optical fibre, or operation at a higher optical fibre temperature for the same power consumption.

Preferably the resistive track is buried within the support layer as this allows the thickness of the track to be controlled more easily and thus improves the consistency of the power dissipation as a function of voltage. Furthermore a buried track can be protected from potential damage, and thus improves the reliability of the heater.

Generally the board structure will be a printed circuit board on which the heater drive circuit and other associated components may be mounted. In a preferred implementation the heater is in the form of an etched copper track of the printed circuit board. In this case the length of the etched track can be selected as a function of the required power dissipation and maximum voltage. Furthermore the track pattern may be chosen to help minimise the inductance and produce more even heating.

Furthermore temperature measurement means, such as at least one thermistor positioned in the vicinity of the heater, may be provided for monitoring the temperature of the heater to control heating by the heater. Alternatively optical sensing means may be provided for monitoring an optical output signal of the amplifier to control the gain flatness and hence the heating by the heater.

The spool will generally have a circular shape, although it is also possible for the spool to have other shapes dependent on the specific application. The only shape constraint is that it should not exceed the minimum bend radius for the optical fibre. Preferably the spool comprises a length of optical fibre wound on a former made from thermally conducting material, such as an aluminium alloy.

Where the heater track is located within the printed circuit board, there is an increased chance that the heat will be lost to the surrounding board instead of transferring into the spool. To counter this loss, the board may be provided with one or more thermally isolating holes or cutouts surrounding the heater in order to decrease heat loss from the vicinity of the heater. Furthermore a heat shroud is preferably provided around at least a part of the heater in order to decrease heat loss from the vicinity of the heater.

BRIEF DESCRIPTION OF THE DRAWINGS

In order that the invention may be more fully understood, reference will now be made, by way of example, to the accompanying drawings, in which:

FIGS. 5 and 6 show an exploded perspective view and an assembled perspective view of the heater of FIG. 2;

FIG. 7 is a view from above of a variant optical amplifier in accordance with the invention.

DETAILED DESCRIPTION OF THE DRAWINGS

The preferred optical amplifier arrangement described below with reference to FIGS. 2 to 6 is an erbium doped fibre amplifier (EDFA). However, this is only one example of an application of the invention, and it should be appreciated that the invention may also be used in a wide variety of other applications in which a heater is required to heat a length of optical fibre. For example a similar arrangement may be used to heat and/or strain a single length of optical fibre with a view to changing some optical characteristic of the fibre.

Figure 1:
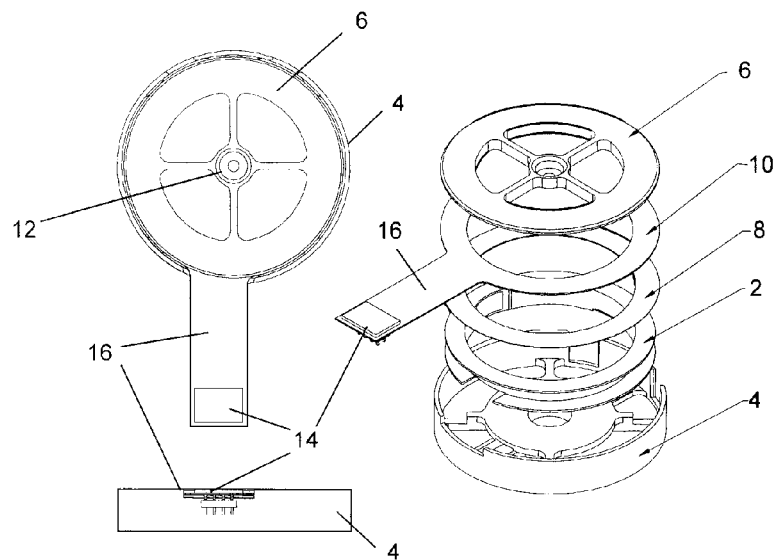
FIG. 1 shows views from above and one side and an exploded perspective view of a known foil heater for an optical amplifier.
Figure 2:
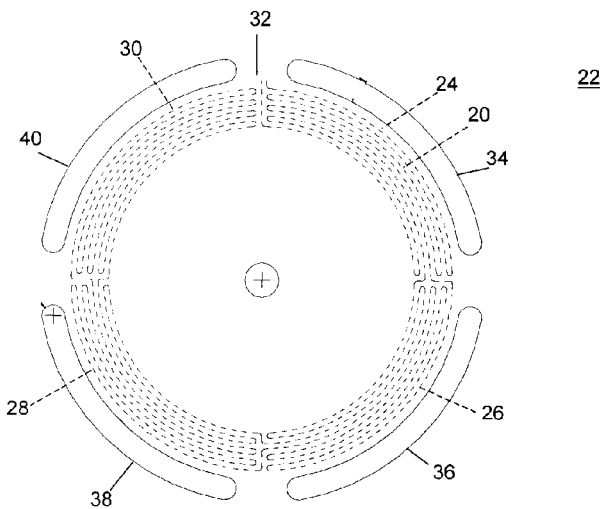
FIG. 2 is a view from above of a heater within an optical amplifier in accordance with the invention.

Referring to FIG. 2 the illustrated optical amplifier in accordance with the invention comprises a heater in the form of a resistive track 20 (as shown in broken lines in the figure) buried within a printed circuit board (PCB) 22. The track 20 is etched from 1 oz copper and has a looped structure comprising a series of loops 24 extending over an arc of approximately 90° which are in turn connected to a further series of loops 26, 28 and 30 also extending over arcs of 90°, with the interconnections being such that all the loops are connected together to form a continuous track having its input and output connections at the same point 32 on the circumference of the heater. The configuration serves to reduce inductance and produce more even heating. Four cutouts 34, 36, 38 and 40 extend through the PCB 22 and substantially surround the heater so as to partially isolate the area of the PCB within the cutouts from the outer regions of the PCB. This serves to minimise loss of heat from the heater outwardly of the central portion of the PCB 22.

It should be noted that there should not be any copper layers in the PCB 22 below the heater, that is within the boundary of the cutouts 34, 36, 38 and 40, in order to reduce the amount of heat loss into the PCB 22 and beyond.

The track 20 is formed on a lower dielectric layer of the PCB 22 by means of a standard photolithographic process in which a layer of copper on a lower dielectric layer is patterned and etched to leave only the required shape of the copper track on the lower dielectric layer. A further dielectric layer is then applied on top of the lower dielectric layer and the track typically to a thickness of about 0.1 mm so that the track is sandwiched between the two layers. The cutouts 34, 36, 38 and 40 are then formed through the PCB 22.

Figure 3:
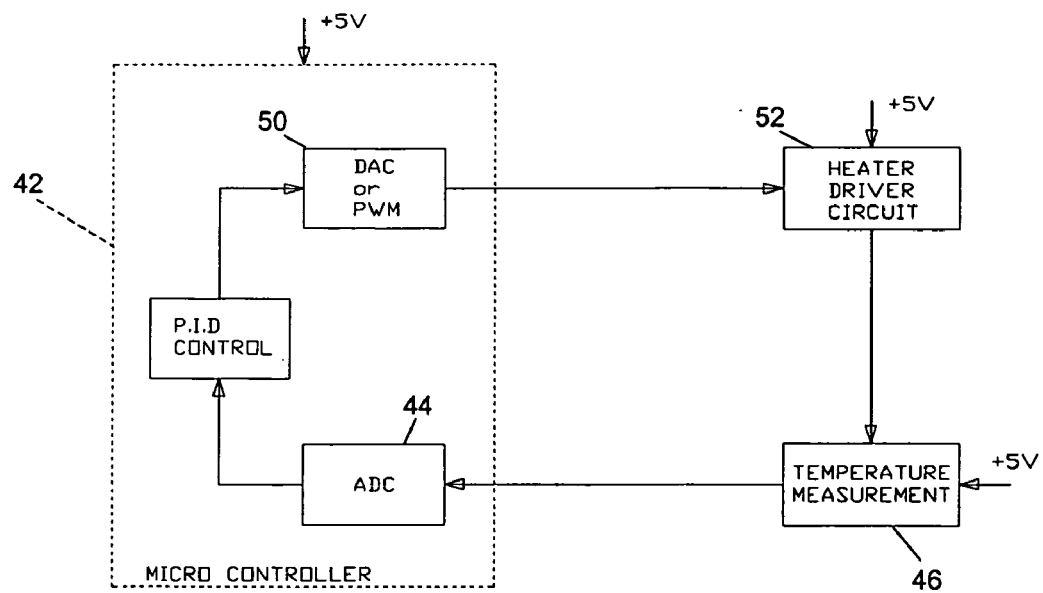
FIG. 3 is a circuit diagram of a drive circuit for the heater of FIG. 2.

A heater drive circuit is also mounted on the PCB having a circuit diagram as shown in FIG. 3, and incorporates a microcontroller 42 comprising an analogue-to-digital converter (ADC) 44 receiving an analogue temperature signal from a temperature measurement sensor 46 for measuring the temperature of the heater, a Proportional/Integral/Differential (PID) control 48 for receiving a digital input signal from the ADC 44, and a digital-to-analogue converter 50 (or pulse width modulator) for converting the digital output signal from the PID control 48 to an analogue output signal for controlling a heater driver 52 for supplying current to the heater track. The heater drive circuit can be controlled to allow variable voltages to be dropped across the heater and to provide temperature-dependent control of the heater. More particularly the PID control 48 allows a set point value (the desired state) to be specified to enable the heater to be controlled in a so-called closed control-loop in which the PID control 48 gradually adjusts its output depending on the value of its input from the temperature measurement sensor. The PID will precisely control the heater so that the temperature approaches and converges upon a set point. It is possible to easily calibrate or tune the PID control by setting proportional, integral and differential constants to minimize overshoot and oscillation about the set point and to change the speed at which the PID control reacts by setting an integral adjustment constant.

Figure 4:
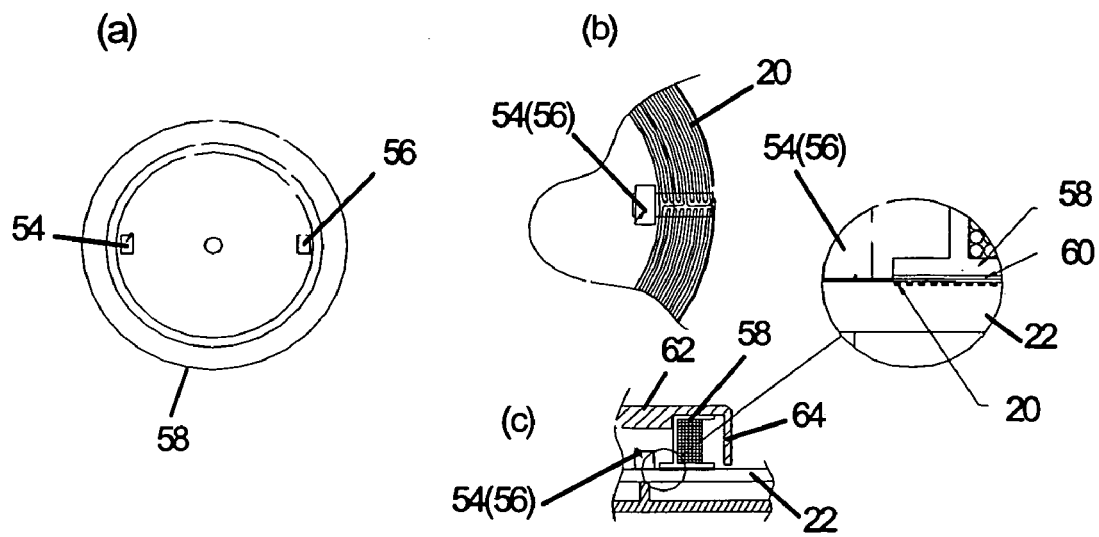
FIG. 4 comprises explanatory diagrams showing details of the structure of the heater of FIG. 2.
Figure 8A:
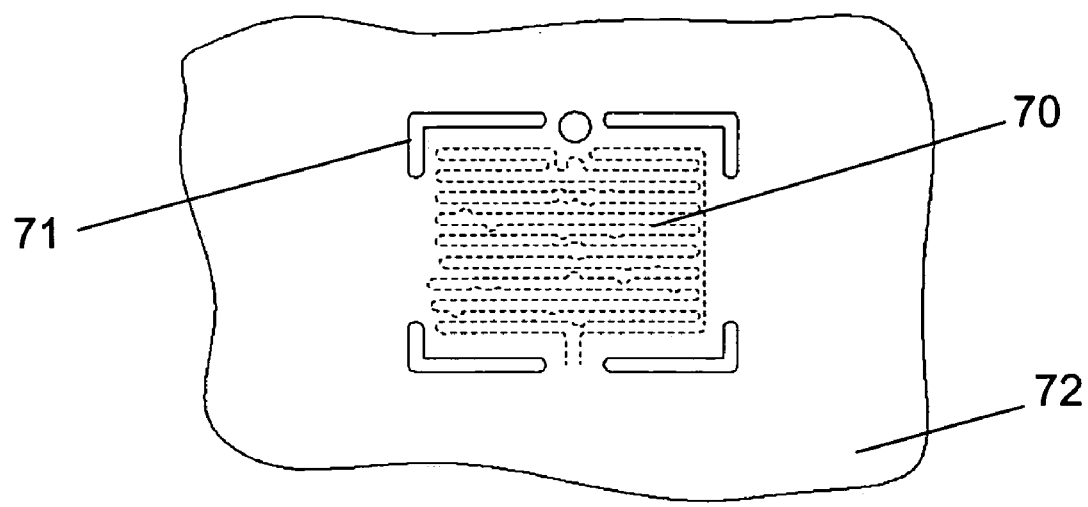
FIG. 8 shows a development of the invention, different stages in assembly being shown at a), b), c) and d).
Figure 8B:
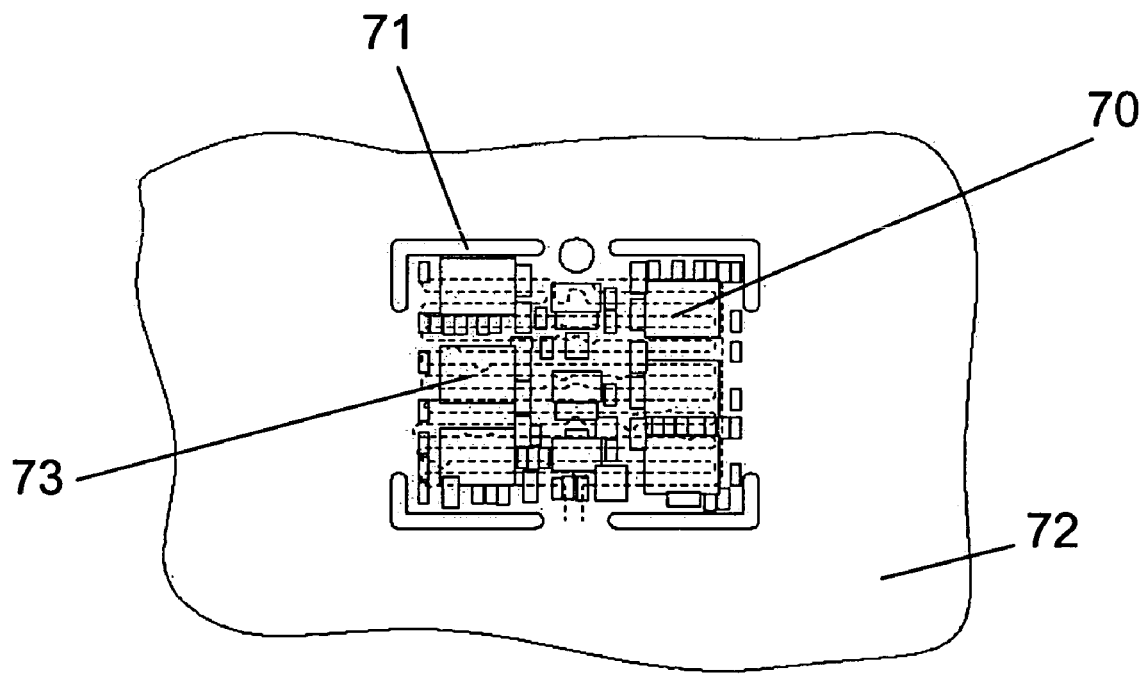
Figure 8C:
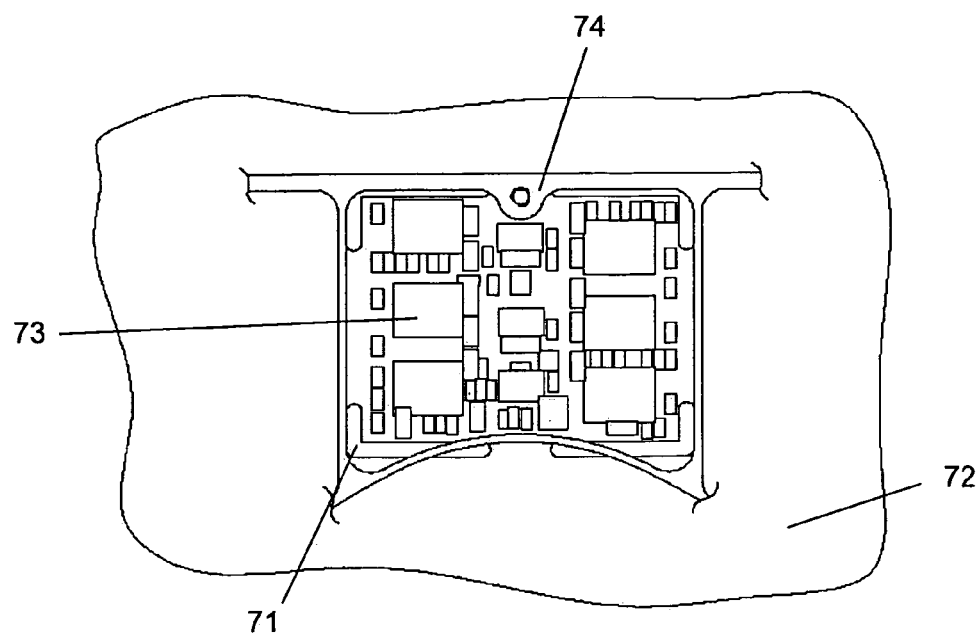
Figure 8D:
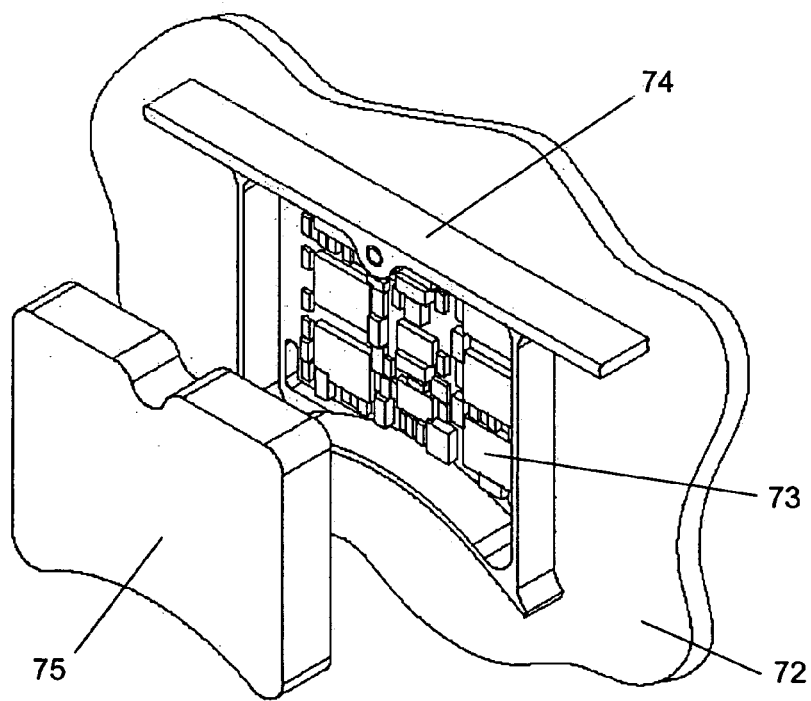

The temperature measurement sensor comprises two thermistors 54 and 56 positioned diametrically opposite one another on the inside of the spool former 58, as shown in the leftmost diagram (a) of FIG. 4. As shown in the detailed cut-away view of diagram (b) and part sectional view of diagram (c) of FIG. 4, each of the thermistors 54, 56 is disposed immediately inside the spool former 58 and in contact with copper connections to the track 20 protruding between the PCB surface and a thermal gasket 60 sandwiched between the spool former 58 and the PCB 22.

As best seen in the exploded view of FIG. 5 the heater comprises the following further components mounted on the PCB 22 in sequence: the thermal gasket 60, the spool former 58 on which the erbium optical fibre is wound in a multilayer configuration as shown in the cut-away view (c) of FIG. 4, and a clamp plate 62 having a downwardly extending wall 64 forming a heat shroud. These components are clamped to the PCB 22 by a screw 66 such that the spool former 58 is pressed against the PCB 22 in the vicinity of the heater track 20 with the thermal gasket 60 sandwiched therebetween. In this way the transfer of heat from the heater to the spool former 58, and thence to the optical fibre wound on the former, is assured. The depending wall 64 of the clamp plate 62 forms a heat shroud that helps to reduce heat loss from the heater due to convection. The thermal gasket 60 and the cutouts 34, 36, 38 and 40 in the PCB 22 act to maximize the temperature difference between the ambient air conditions and the optical fibre temperature as a function of heater power dissipation.

The spool former 58 is made from a thermally conductive material, such as an aluminium alloy, which allows the optical fibre to be wound on it in successive layers. The former is designed to support the optical fibre after winding for transportation and assembly into the optical amplifier. Furthermore winding of the optical fibre in layers keeps the optical fibre in close contact and allows the heat to spread evenly. The size and shape of the former is dependent upon the specific application, and the optical fibre is preferably wound in a closed loop to maximize space efficiency. The only shape constraint for the former is that it should not exceed the minimum bend radius for the optical fibre. The shape of the heater track on the PCB reflects the shape of the former that it is to heat, and in the illustrated embodiment is of course annular. Other materials may be used for the former to enhance heat conduction or to reduce manufacturing cost, for example by using a plastics moulding.

In the embodiment described above the support structure is a PCB, that is a multilayer structure comprising dielectric layers and one or more electrically conducting layers (generally of copper). However, other forms of multilayer support structure could also be used in this application, and in particular ceramics layers may be used in place of the dielectric layers, and alternative electrically conductive layers may be used which do not have temperature dependent resistance. In the particular example the track is formed by etching, but it would alternatively be possible for the track to be formed by laser cutting or trimming. However, it has been found that standard manufacturing processes and tolerances associated with PCB manufacture give good heater performance, thus enhancing the cost savings associated with this design.

In a development of the invention a transistor forming part of the heater drive circuit for controlling the temperature of the heater is provided with a heat sink 68 that is in thermal contact with a copper annulus 70 sandwiched between the PCB 22 in the vicinity of the heater track 20 and the thermal gasket 60 (see FIG. 4(c)). In this way the heat emitted by the transistor can be used to supplement the heating by the heater.

In a further non-illustrated development of the invention shown in FIG. 8 a log amp heater formed by a resistive track 70 similar to the track 20 as described above is provided in order to provide heating of a log amp circuit. A cut out 71 is provided in the PCB 72, as shown in FIG. 8 a), around the area in which the log amp circuit is to be installed to help to thermally isolate the log amp circuit. This helps to reduce heat loss due to conduction through the plane of the PCB. The heater track length is dictated by the required power dissipation from the heater to achieve the required delta T from the ambient air temperature. The heater track shape is dictated firstly by the required length and then by the requirement that it does not electrically short with any feature on the PCB, e.g. tracks and vias. The log amp circuit is required to measure the optical power of the amplifier. However the circuit is prone to temperature dependent variations. Therefore, by controlling the temperature of the circuit to a constant value, above ambient temperature, the performance of the measuring circuit can be made to be consistent. The components 73 of the log amp circuit are shown installed on the PCB 72 in FIG. 8 *b*). An aluminium ring frame 74 is located around the outside of the circuit as shown in FIG. 8 *c*), and a foam insert 75 is located over the top of the components as shown in FIG. 8 *d*) to reduce the heat loss due to convection and radiation.

The invention claimed is:

1. An optical amplifier, comprising:
    a multilayer printed circuit board comprising at least one support layer of electrically non-conducting material and at least one conductive layer of electrically conducting material,
    a spool of optical fibre mounted on the printed circuit board,
    a heater in the form of a resistive track within said at least one conductive layer of the printed circuit board for effecting resistive heating of the optical fibre, and
    a heater drive circuit mounted on the printed circuit board.

2. An optical amplifier according to claim 1, wherein the resistive track is buried within said support layer.

3. An optical amplifier according to claim 1, wherein the heater is in the form of an etched copper track of the printed circuit board.

4. An optical amplifier according to claim 1, wherein temperature measurement means is provided for monitoring the temperature of the heater to control heating by the heater.

5. An optical amplifier according to claim 4, wherein the temperature measurement means comprises at least one thermistor positioned in the vicinity of the heater.

6. An optical amplifier according to claim 1, wherein the spool has a generally circular shape.

7. An optical amplifier according to claim 1, wherein the spool comprises a length of optical fibre wound on a former made from thermally conducting material.

8. An optical amplifier according to claim 1, wherein the printed circuit board is provided with one or more thermally isolating holes surrounding the heater in order to decrease heat loss from the vicinity of the heater.

9. An optical amplifier according to claim 1, wherein a heat shroud is provided around at least a part of the heater in order to decrease heat loss from the vicinity of the heater.

10. An optical amplifier according to claim 1, wherein the spool is mounted on the printed circuit board by a clamp assembly.

11. An optical amplifier according to claim 1, wherein the optical fibre is an erbium fibre.

12. An optical amplifier according to claim 1, wherein heating of the optical fibre is supplemented by heat emitted by a transistor on the printed circuit board.

13. An optical amplifier according to claim 1, wherein the heater is additionally adapted to heat associated electronic circuitry.

* * * * *